(12) United States Patent
Aloni et al.

(10) Patent No.: US 8,660,137 B2
(45) Date of Patent: Feb. 25, 2014

(54) METHOD AND SYSTEM FOR QUALITY OF SERVICE AND CONGESTION MANAGEMENT FOR CONVERGED NETWORK INTERFACE DEVICES

(75) Inventors: Eliezer Aloni, Zur Yigal (IL); Kobby Carmona, Hod HaSharon (IL); Uri Elzur, Irvine, CA (US)

(73) Assignee: Broadcom Israel Research, Ltd., Ramat Gan (IL)

( * ) Notice: Subject to any disclaimer, the term of this patent is extended or adjusted under 35 U.S.C. 154(b) by 1242 days.

(21) Appl. No.: 11/537,256

(22) Filed: Sep. 29, 2006

(65) Prior Publication Data

US 2007/0070901 A1 Mar. 29, 2007

Related U.S. Application Data

(60) Provisional application No. 60/721,941, filed on Sep. 29, 2005.

(51) Int. Cl.
*H04L 12/42* (2006.01)

(52) U.S. Cl.
USPC .......................................................... 370/451

(58) Field of Classification Search
USPC ............... 370/229–235.1, 229–236, 351–463
See application file for complete search history.

(56) References Cited

U.S. PATENT DOCUMENTS

| | | | |
|---|---|---|---|
| 5,282,203 A * | 1/1994 | Oouchi .......................... 370/232 |
| 5,675,829 A * | 10/1997 | Oskouy et al. ..................... 710/6 |
| 6,359,884 B1 * | 3/2002 | Vincent .......................... 370/389 |
| 6,502,132 B1 * | 12/2002 | Kumano et al. ................. 709/224 |
| 6,549,960 B1 * | 4/2003 | Allison et al. .................... 710/29 |
| 6,570,876 B1 * | 5/2003 | Aimoto .......................... 370/389 |
| 6,775,283 B1 * | 8/2004 | Williams ........................ 370/392 |
| 7,346,701 B2 * | 3/2008 | Elzur et al. ..................... 709/232 |
| 7,474,668 B2 * | 1/2009 | Bauman et al. ................. 370/412 |
| 7,499,457 B1 * | 3/2009 | Droux et al. ................. 370/395.7 |
| 7,512,144 B2 * | 3/2009 | Fan ................................ 370/419 |
| 7,640,591 B1 * | 12/2009 | Tripathi et al. ................... 726/25 |
| 7,668,165 B2 * | 2/2010 | Hoskote et al. ................ 370/392 |
| 7,721,299 B2 * | 5/2010 | van Riel ........................ 719/319 |
| 7,746,783 B1 * | 6/2010 | Tripathi et al. ................ 370/235 |
| 7,864,790 B2 * | 1/2011 | Huang ............................ 370/412 |
| 7,864,806 B2 * | 1/2011 | Qiu et al. ....................... 370/474 |
| 7,894,480 B1 * | 2/2011 | Wang et al. .................... 370/474 |
| 8,019,901 B2 * | 9/2011 | Starr et al. ..................... 709/250 |
| 8,161,197 B2 * | 4/2012 | McDaniel et al. ............. 709/250 |
| 8,311,059 B2 * | 11/2012 | Williams ........................ 370/469 |
| 2001/0037397 A1 * | 11/2001 | Boucher et al. ................ 709/230 |
| 2002/0009075 A1 * | 1/2002 | Fesas, Jr. ........................ 370/363 |
| 2002/0091844 A1 * | 7/2002 | Craft et al. ..................... 709/230 |
| 2002/0120720 A1 * | 8/2002 | Moir .............................. 709/220 |
| 2002/0163914 A1 * | 11/2002 | Dooley .......................... 370/394 |
| 2002/0169921 A1 * | 11/2002 | Saitoh .............................. 711/5 |
| 2003/0043823 A1 * | 3/2003 | Klotsche ........................ 370/400 |
| 2003/0067930 A1 * | 4/2003 | Salapura et al. ............... 370/412 |

(Continued)

*Primary Examiner* — Kwang B Yao
*Assistant Examiner* — Juvena Loo
(74) *Attorney, Agent, or Firm* — Thomas | Horstemeyer, LLP

(57) ABSTRACT

Certain aspects of a method and system for quality of service and congestion management for converged network interface devices are disclosed. Aspects of a method may include processing at least one of: input/output (I/O) requests and network packets in a converged network interface card (CNIC) based on a class associated with each of the I/O requests and network packets by storing on the CNIC, information that identifies the I/O requests and network packets, without storing on the I/O requests and network packets on the CNIC.

29 Claims, 7 Drawing Sheets

(56) References Cited

U.S. PATENT DOCUMENTS

| | | | |
|---|---|---|---|
| 2003/0147349 A1* | 8/2003 | Burns | 370/230.1 |
| 2003/0187914 A1* | 10/2003 | Kaniyar et al. | 709/201 |
| 2003/0198224 A1* | 10/2003 | Lee et al. | 370/392 |
| 2003/0227926 A1* | 12/2003 | Ramamurthy et al. | 370/395.42 |
| 2004/0013117 A1* | 1/2004 | Hendel et al. | 370/394 |
| 2004/0022190 A1* | 2/2004 | Davies et al. | 370/230 |
| 2004/0042483 A1* | 3/2004 | Elzur et al. | 370/463 |
| 2004/0062261 A1* | 4/2004 | Zecharia et al. | 370/419 |
| 2004/0095883 A1* | 5/2004 | Chu et al. | 370/235 |
| 2004/0143593 A1* | 7/2004 | Le Maut et al. | 707/102 |
| 2004/0158644 A1* | 8/2004 | Albuquerque et al. | 709/238 |
| 2005/0135395 A1* | 6/2005 | Fan et al. | 370/412 |
| 2005/0147126 A1* | 7/2005 | Qiu et al. | 370/474 |
| 2005/0249228 A1* | 11/2005 | Cornett | 370/413 |
| 2005/0286544 A1* | 12/2005 | Kitchin et al. | 370/412 |
| 2006/0174251 A1* | 8/2006 | Pope et al. | 719/318 |
| 2006/0233177 A1* | 10/2006 | Basso et al. | 370/395.4 |
| 2007/0147404 A1* | 6/2007 | van Haalen | 370/412 |

* cited by examiner

METHOD AND SYSTEM FOR QUALITY OF SERVICE AND CONGESTION MANAGEMENT FOR CONVERGED NETWORK INTERFACE DEVICES

CROSS-REFERENCE TO RELATED APPLICATIONS/INCORPORATION BY REFERENCE

This patent application makes reference to, claims priority to and claims benefit from U.S. Provisional Patent Application Ser. No. 60/721,941, filed on Sep. 29, 2005.

The above reference application is hereby incorporated herein by reference in its entirety.

FIELD OF THE INVENTION

Certain embodiments of the invention relate to networking. More specifically, certain embodiments of the invention relate to a method and system for quality of service and congestion management for converged network interface devices.

BACKGROUND OF THE INVENTION

Innovations in data communications technology, fueled by bandwidth-intensive applications, have led to a ten-fold improvement in networking hardware throughput occurring about every four years. These network performance improvements, which have increased from 10 Megabits per second (Mbps) to 100 Mbps, and now to 1-Gigabit per second (Gbps) with 10-Gigabit on the horizon, have outpaced the capability of central processing units (CPUs). To compensate for this dilemma and to free up CPU resources to handle general computing tasks, offloading Transmission Control Protocol/Internet Protocol (TCP/IP) functionality to dedicated network processing hardware is a fundamental improvement. TCP/IP chimney offload maximizes utilization of host CPU resources for application workloads, for example, on Gigabit and multi-Gigabit networks.

Converged network interface devices are generally utilized to integrate a plurality of different types of network traffic into one physical network. Although there may be instances when the quality of service (QoS) requirements for the different types of traffic are consistent, it is often the case that these QoS requirements are inconsistent with each other. Management traffic, for example, may require guaranteed delivery regardless of traffic conditions. Converged network interface devices may perform protocol acceleration and protocol processing beyond OSI layer 2 and may require considerable computational power. As a result, these devices may not be able to sustain line rate for the shortest packets. However, a denial of service (DoS) attack may fill the wire at its line rate, with short packets of meaningless traffic, which may block management traffic. Certain types of traffic such as clustering traffic may require low latency. Storage traffic, for example, may require guaranteed delivery while using the shortest packets infrequently, with normal traffic patterns. Some type of traffic such as critical networking traffic may require varying levels of prioritization, while other networking traffic may require best effort.

Clustering traffic may use proprietary or standardized clustering technologies. Storage traffic may use fiber channel, for example, while networking traffic may use Ethernet. In many cases, management traffic may utilize a separate out of band management network to guarantee delivery and avoid mixing it with the user Ethernet network. Each of these separate networks may be specifically designed to guarantee the quality of service required for the payload it carries so that there are no other traffic types with conflicting QoS requirements trying to share the same network. When consolidating all these networks over a single network that carries all traffic types, the converged network may provide similar QoS as guaranteed by the physically separate networks.

Congestion avoidance is an algorithm that may be utilized, for example, by TCP based traffic in conjunction with slow start to minimize the effects of lost packets. Congestion may occur when a device may receive more TCP segments at its input than it may be able to adequately process with some minimal acceptable delay. Congestion may also occur when TCP segments transition from a faster transport infrastructure to a slower transport infrastructure. In this regard, the network device at the edge of the faster transport infrastructure and the slower transport infrastructure may become a bottleneck. Congestion avoidance utilizes packet loss and duplicate acknowledgements (ACKs) to determine when congestion occurs. Although slow start and congestion avoidance have varying objectives and are independent of each other, TCP recovery from congestion may involve decreasing the transmission rate and executing slow start to gradually increase the transmission rate from a window size of one (1). In some cases, TCP may generate numerous ACKs and congestion avoidance may interpret this to mean that TCP segments are lost, resulting in retransmission. Accordingly, TCP recovery from congestion avoidance and/or TCP slow start may be a relatively slow process and may in certain instances, also cause unwanted retransmissions, Memory bandwidth has not scaled at the same pace as network bandwidth, and as a result, networking devices with external memory are difficult and expensive to build. The buffer memories embedded within the networking device may have the required memory bandwidth to buffer networking traffic. Since the buffer memory has to be internal to the device, whether switching device or network interface device, its size is usually considerably smaller than external memory, traditionally used for lower speed devices.

Buffer memory in packet networks typically needs to compensate for the round trip time of the network along with some control loop elements, typically in both ends but also in the infrastructure. So, as networks are shifting from 1 Gbps to 10 Gbps, buffer space and memory bandwidth should both scale by a factor of 10 to compensate for the same round trip time, if similar round trip time is assumed. Aggravating the problems even further may be the trend of shifting from external to internal memories, as it may reduce the available buffer space. This severe reduction in buffer space may severely impact the TCP flow control, the clear predominant protocol that is used for the vast majority of network traffic and potentially other application level flow controls or any other measures used.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for quality of service and congestion management for converged network interface devices, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for quality of service and congestion management for converged network interface devices. Aspects of the method and system may comprise processing at least one of: input/output (I/O) requests and network packets in a converged network interface card (CNIC) based on a class associated with each of the I/O requests and network packets by storing on the CNIC, information that identifies the I/O requests and network packets, without storing on the I/O requests and network packets on the CNIC. Notwithstanding, similar methods may be utilized for a conventional NIC.

In accordance with an embodiment of the invention, a plurality of I/O requests or network packets may be classified into a plurality of queues based on a determined class of each of the plurality of I/O requests or network packets. A connection identifier for each of the plurality of I/O requests or network packets may be stored in the plurality of queues on a converged network interface card (CNIC) processor. The order of transmission of the plurality of I/O requests or network packets in the plurality of queues may be prioritized based on the classification of the plurality of I/O requests or network packets. The arbitration of the next queue to be transmitted may be performed prior to transfer of data corresponding to the plurality of I/O requests or network packets from a host memory to a converged network interface card (CNIC) processor.

Figure 1A:
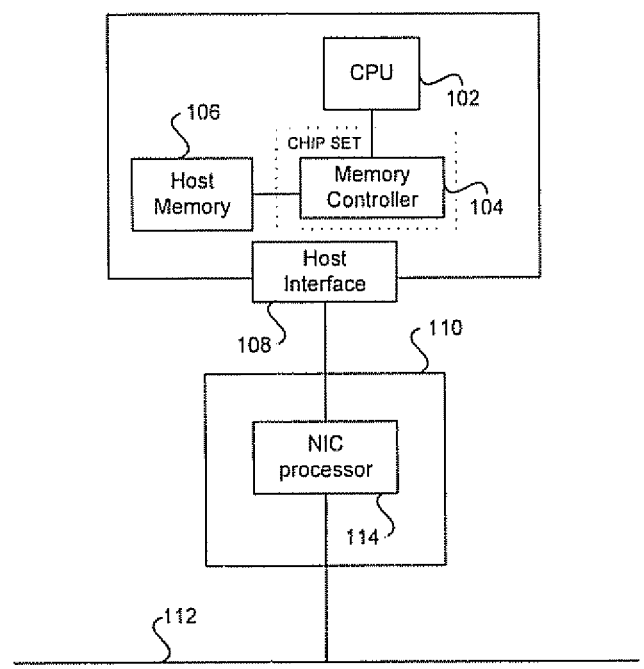
FIG. 1A is a block diagram of an exemplary system that may be utilized for quality of service and congestion management for converged network interface devices in accordance with an embodiment of the invention.

FIG. 1A is a block diagram of an exemplary system that may be utilized for quality of service and congestion management for converged network interface devices in accordance with an embodiment of the invention. Accordingly, the system of FIG. 1A may be adapted to handle transparent TCP offload of transmission control protocol (TCP) datagrams or packets. Referring to FIG. 1A, the system may comprise, for example, a CPU 102, a memory controller 104, a host memory 106, a host interface 108, network subsystem 110 and an Ethernet 112. The network subsystem 110 may comprise, for example, a CNIC 114. The host interface 108 may be, for example, a peripheral component interconnect (PCI), PCI-X, PCI-Express, ISA, SCSI or other type of bus. The memory controller 104 may be coupled to the CPU 102, to the memory 106 and to the host interface 108. The host interface 108 may be coupled to the network subsystem 110 via the CNIC 114.

Figure 1B:
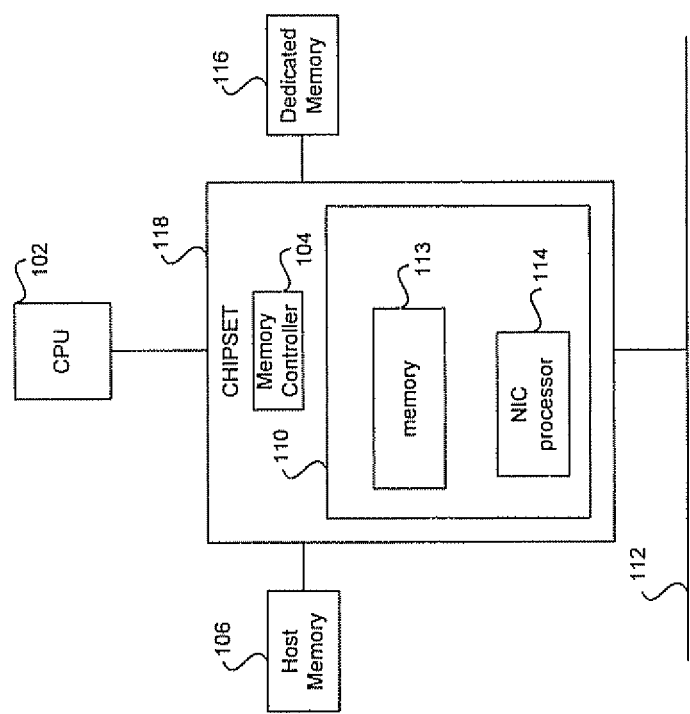
FIG. 1B is a block diagram of another exemplary system that may be utilized for quality of service and congestion management for converged network interface devices, in accordance with an embodiment of the invention.

FIG. 1B is a block diagram of another exemplary system that may be utilized for quality of service and congestion management for converged network interface devices in accordance with an embodiment of the invention. Referring to FIG. 1B, the system may comprise, for example, a CPU 102, a host memory 106, a dedicated memory 116 and a chip set 118. The chip set 118 may comprise, for example, the network subsystem 110 and the memory controller 104. The chip set 118 may be coupled to the CPU 102, to the host memory 106, to the dedicated memory 116 and to the Ethernet 112. The network subsystem 110 of the chip set 118 may be coupled to the Ethernet 112. The network subsystem 110 may comprise, for example, the CNIC 114 that may be coupled to the Ethernet 112. The network subsystem 110 may communicate to the Ethernet 112 via a wired and/or a wireless connection, for example. The wireless connection may be a wireless local area network (WLAN) connection as supported by the IEEE 802.11 standards, for example. The network subsystem 110 may also comprise, for example, an on-chip memory 113. The dedicated memory 116 may provide buffers for context and/or data.

The network subsystem 110 may comprise a processor such as a coalescer 111. The coalescer 111 may comprise suitable logic, circuitry and/or code that may be enabled to handle the accumulation or coalescing of TCP data. In this regard, the coalescer 111 may utilize a flow lookup table (FLT) to maintain information regarding current network flows for which TCP segments are being collected for aggregation. The FLT may be stored in, for example, the network subsystem 110. The FLT may comprise at least one of the following: a source IP address, a destination IP address, a source TCP address, a destination TCP address, for example. In an alternative embodiment of the invention, at least two different tables may be utilized, for example, a table comprising a 4-tuple lookup to classify incoming packets according to their flow. The 4-tuple lookup table may comprise at least one of the following: a source IP address, a destination IP address, a source TCP address, a destination TCP address, for example. A flow context table may comprise state variables utilized for aggregation such as TCP sequence numbers.

The FLT may also comprise at least one of a host buffer or memory address including a scatter-gather-list (SGL) for non-continuous memory, a cumulative acknowledgments (ACKs), a copy of a TCP header and options, a copy of an IP header and options, a copy of an Ethernet header, and/or accumulated TCP flags, for example. The coalescer 111 may be enabled to generate a single aggregated TCP segment from the accumulated or collected TCP segments when a termination event occurs. The single aggregated TCP segment may be communicated to the host memory 106, for example.

Although illustrated, for example, as a CPU and an Ethernet, the present invention need not be so limited to such examples and may employ, for example, any type of processor and any type of data link layer or physical media, respectively. Accordingly, although illustrated as coupled to the Ethernet 112, the CNIC 114 of FIG. 1A may be adapted for any type of data link layer or physical media. Furthermore, the present invention also contemplates different degrees of integration and separation between the components illustrated in FIGS. 1A-B. For example, the CNIC 114 may be a separate integrated chip from the chip set 118 embedded on a motherboard or may be embedded in a NIC. Similarly, the coalescer 111 may be a separate integrated chip from the chip set 118 embedded on a motherboard or may be embedded in a NIC. In addition, the dedicated memory 116 may be integrated with the chip set 118 or may be integrated with the network subsystem 110 of FIG. 1B.

Figure 1C:
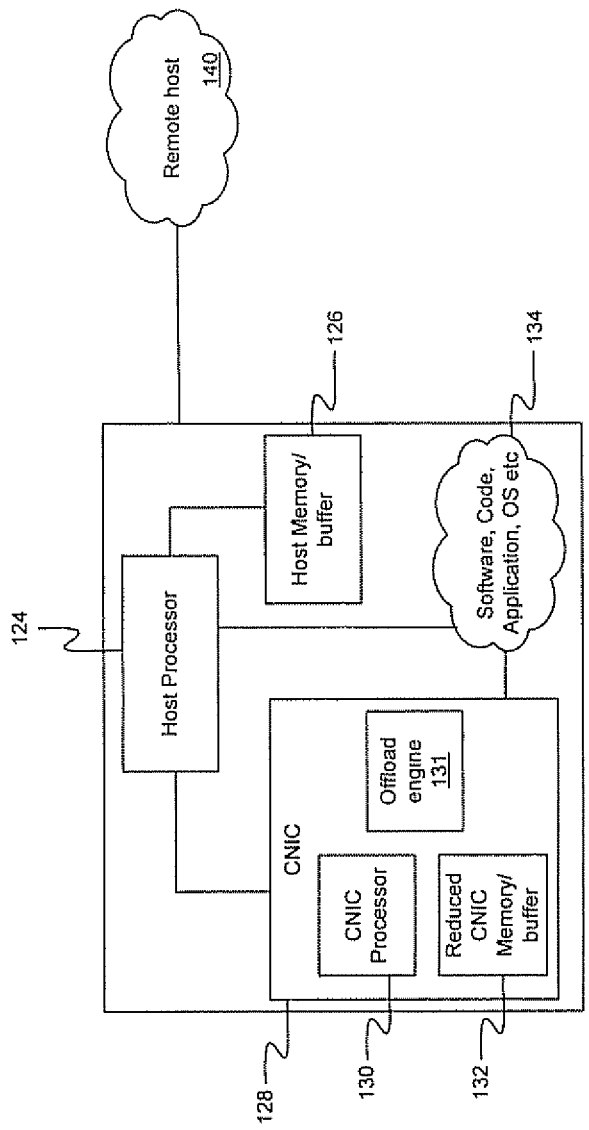
FIG. 1C is an alternative embodiment of an exemplary system that may be utilized for quality of service and congestion management for converged network interface devices, in accordance with an embodiment of the invention.

FIG. 1C is an alternative embodiment of an exemplary system that may be utilized for quality of service and congestion management for converged network interface devices in accordance with an embodiment of the invention. Referring to FIG. 1C, there is shown a host processor 124, a host memory/buffer 126, a software algorithm block 134 and a CNIC block 128. The CNIC block 128 may comprise a CNIC processor 130, a processor such as an offload engine 131 and a reduced CNIC memory/buffer block 132. The CNIC block 128 may communicate with an external network via a wired and/or a wireless connection, for example. The wireless connection may be a wireless local area network (WLAN) connection as supported by the IEEE 802.11 standards, for example.

The CNIC processor 130 may comprise suitable logic, circuitry and/or code that may be adapted to support TCP offload (TOE), iSCSI, and remote direct memory access (RDMA). The CNIC processor 130 may enable a converged fabric for networking, storage, and clustering. The CNIC processor 130 may be utilized in blade servers where multiple fabrics may require wider backplanes, more power, and more slots.

The offload engine 131 may be a dedicated processor or hardware state machine that may reside in the packet-receiving path. The host TCP stack may comprise software that enables management of the TCP protocol processing and may be part of an operating system, such as Microsoft Windows or Linux. The offload engine 131 may comprise suitable logic, circuitry and/or code that may enable accumulation or coalescing of TCP data. In this regard, the offload engine 131 may utilize a flow lookup table (FLT) to maintain information regarding current network flows for which TCP segments are being collected for aggregation. The FLT may be stored in, for example, the reduced CNIC memory/buffer block 132. The offload engine 131 may enable generation of a single aggregated TCP segment from the accumulated or collected TCP segments when a termination event occurs. The single aggregated TCP segment may be communicated to the host memory/buffer 126, for example.

In accordance with certain embodiments of the invention, providing a single aggregated TCP segment to the host for TCP processing significantly reduces overhead processing by the host 124. Furthermore, since there is no transfer of TCP state information, dedicated hardware such as a CNIC 128 may assist with the processing of received TCP segments by coalescing or aggregating multiple received TCP segments so as to reduce per-packet processing overhead.

In conventional TCP processing systems, it is necessary to know certain information about a TCP connection prior to arrival of a first segment for that TCP connection. In accordance with various embodiments of the invention, it is not necessary to know about the TCP connection prior to arrival of the first TCP segment since the TCP state or context information is still solely managed by the host TCP stack and there is no transfer of state information between the hardware stack and the software stack at any given time.

Figure 2:
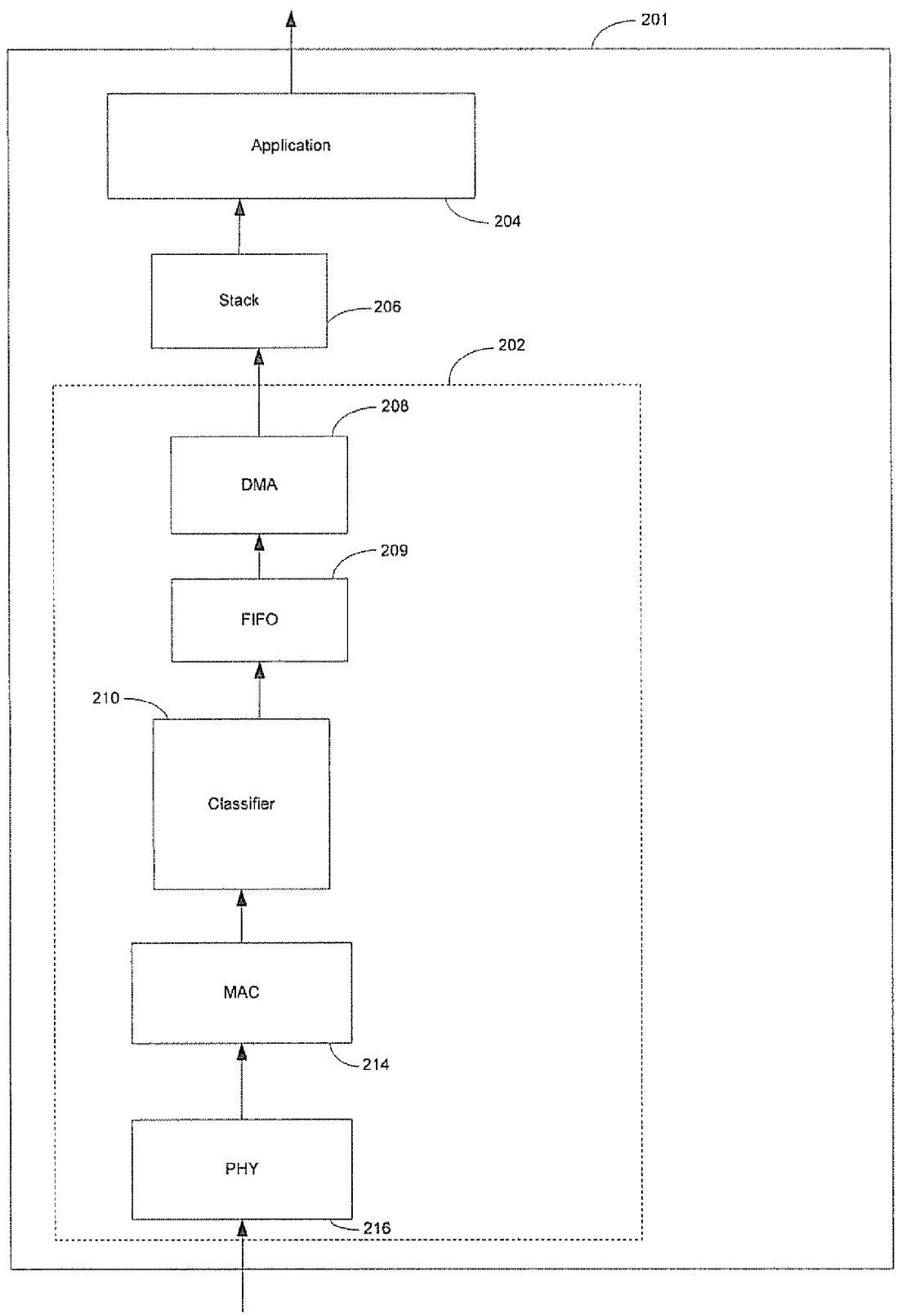
FIG. 2 is a block diagram of exemplary hardware with a converged network interface controller (CNIC) for quality of service and congestion management for converged network interface devices, in accordance with an embodiment of the invention.

FIG. 2 is a block diagram of exemplary hardware with a converged network interface controller (CNIC) for quality of service and congestion management for converged network interface devices, in accordance with an embodiment of the invention. Referring to FIG. 2, there is shown a host 201. The host 201 may comprise an application 204, a networking stack 206 and a converged network interface controller (CNIC) block 202. The CNIC 202 may comprise a direct memory access (DMA) block 208, a first in first out (FIFO) buffer block 209, a classifier block 210, a medium access control (MAC) layer block 214 and a physical (PHY) layer block 216.

The CNIC 202 may comprise suitable logic, circuitry and/or code that may be utilized to connect a workstation to a local area network (LAN), for example. The CNIC 202 may be enabled to transfer data from a host 201 or host resident application 204 or host resident communications stack 206, format it into a specific packet format required by the LAN protocol, for example, Ethernet or a higher layer protocol and transfer it to a shared medium via a cable, for example. The DMA block 208 may comprise suitable logic, circuitry and/or code that may be enabled to transfer data from a storage device or a LAN interface controller directly to random access memory (RAM), which speeds up processing of data. The FIFO buffer 209 may comprise suitable logic, circuitry and/or code that may be enabled to employ a buffering scheme to store network packets until they are placed in the host RAM by the DMA 208. The FIFO buffer 209 may be coupled to the DMA block 208, and the classifier block 210. The classifier block 210 may comprise suitable logic, circuitry and/or code that may be enabled to determine the connection identifier and/or a packet type for each packet.

The MAC layer block 214 may comprise suitable logic, circuitry and/or code that may be enabled to control access to a medium that may be shared between two or more entities. The MAC layer block 214 may comprise a MAC address that is unique to each CNIC. The MAC layer block 214 may be enabled to encode and decode data packets into bits. The MAC layer block 214 may be enabled to furnish transmission protocol knowledge and management and may handle errors in the physical layer, flow control and frame synchronization. The MAC layer block 214 may control how a computer on the network gains access to the data and permission to transmit it. The physical layer (PHY) block 216 may provide for transmission of information over a physical medium connecting two devices. The PHY layer block 216 may transmit a bit stream, for example, an electrical impulse, light or radio signal through the network at the electrical and mechanical level. The PHY layer block 216 provides the hardware for sending and receiving data on a carrier, for example, cables.

A connection Identifier comprising some of the address fields of a particular frame may be used to associate a received frame with a connection for handling. Exemplary address fields that may be part of a connection identifier may be an Ethernet MAC address, 802.1 fields, Ethernet frame type, layer 3 addresses such as IPv4 or IPv6 addresses, layer 4 address, for example, TCP or UDP ports, higher layer headers or fields, for example, network file system (NFS) header or iSCSI protocol data unit (PDU) header fields. The connection identifier may be a unique string representing the name of the connection.

A packet type may be referred to as a class of frames. The TCP SYN may be a single bit in a field of six control bits in a TCP header. The SYN bit may be utilized to synchronize sequence numbers in order to ensure that every octet in a given TCP packet may be received and acknowledged. A packet type may be a characteristic that may be present in a frame or a multitude of frames that are, for example, a login request for a protocol. For example, iSCSI or a frame or a group of frames carrying some credential or connection request information. The packet type may comprise a complete field or portions of any of the above fields or any combination of fields or sub fields or wild cards. A connection identifier may be a collection of information trying to associate a frame or frames with a particular endpoint, connection, group of connections or a specific origin. A frame type may be a collection of information trying to identify a specific type of frames potentially across more than one connection.

In one embodiment of the invention, the CNIC 202 may utilize multiple queues for transmission of differentiated traffic classes. To save on-chip memory, the connection identifier, or the minimum information required to identify the transmission task may be queued for transmission. Connection state information, transmission buffer descriptors, and transmission buffers may reside on host memory 126, and may be fetched from host memory 126 to the CNIC 202 as needed. The fetching may be done just prior to its transmission over the wire.

Traditional quality of service schemes may utilize multiple queues, and each queue may contain formatted packets that are ready to be transmitted over the wire. The arbitration between the queues may be performed just prior to transmission over the wire. These schemes may require a considerable amount of buffer space, and the memory requirements may increase as the number of different classes of service, and the difference in bandwidth and latency requirements between these classes of service, increases.

Figure 3:
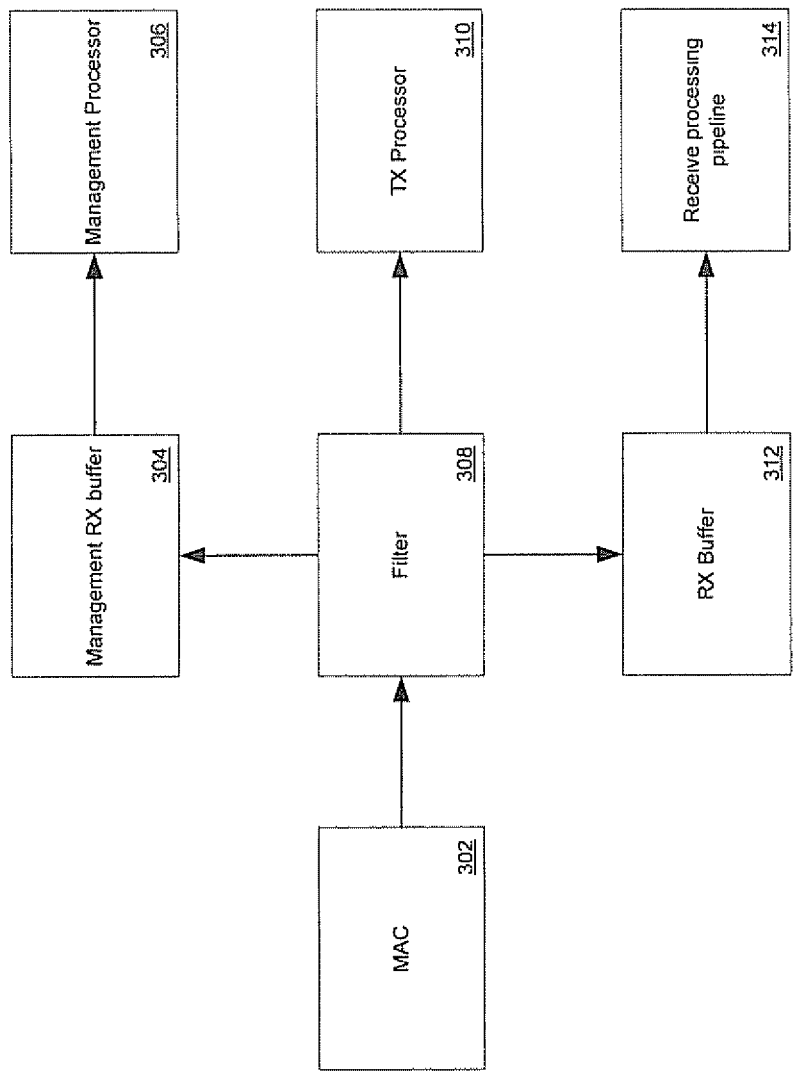
FIG. 3 is a block diagram of an exemplary system for quality of service and congestion management for converged network interface devices, in accordance with an embodiment of the invention.

FIG. 3 is a block diagram of an exemplary system for quality of service and congestion management for converged network interface devices, in accordance with an embodiment of the invention. Referring to FIG. 3, there is shown a MAC layer block 302, a filter 308, a transmit processor 310, a receive buffer 312, a receive processing pipeline 314, a management buffer 304, and a management processor 306.

The MAC layer block 302 may comprise suitable logic, circuitry and/or code that may be enabled to control access to a medium that may be shared between two or more entities. The MAC layer block 302 may utilize a MAC address that is unique to each CNIC. The MAC layer block 214 may be enabled to encode and decode data packets into bits. The MAC layer block 214 may be enabled to furnish transmission protocol knowledge and management and may handle errors in the physical layer, flow control and frame synchronization.

The filter 308 may comprise suitable logic, circuitry and/or code that may be enabled to classify incoming management packets and provide them with a higher priority. The filter 308 may be enabled to classify congestion management packets and deliver them to the transmit processor 310 in order to shorten the response time of the congestion control loop or avoid adding the receive pipeline latency to the congestion response time. If the packet type is not configured for processing by the filter 308, then the packet may be subject to connection identifier processing before it is passed through the filter 308. In another embodiment of the invention, the connection identifier may be processed before the connection type or both the connection identifier and the connection type of the packet may be processed in a single step and passed through the filter 308.

The management buffer 304 may comprise suitable logic and/or circuitry that may be enabled to store management specific data packets and transmit them to the management processor 306. The management processor 306 may comprise suitable logic, circuitry and/or code that may be enabled to process management and administrative related data packets.

The transmit processor 310 may comprise suitable logic, circuitry and/or code that may be enabled to rate limit the packets either statically based on a per class basis or dynamically when the transmit processor 310 receives the congestion management packets from the filter 308. The transmit processor 310 may count the number of packets of the selected type that are received for transmission in a period of time, and if the number exceeds a programmed threshold, the excess packets may be dropped. The receiver buffer 312 and the receive processing pipeline 314 may comprise suitable logic, circuitry and/or code that may be enabled to store and process the packets on the receive side.

In accordance with an embodiment of the invention, arbitration of a next queue to transmit on the wire may be performed by the filter 308 prior to moving the data from host memory 106 to the CNIC 202, while queues may store task or connection identifiers, thereby reducing buffer requirements. In accordance with another embodiment of the invention, management traffic may be an exception to the above scheme. In this regard, in order to guarantee the delivery of management traffic under any networking or processing load on the CNIC 202, dedicated buffers, for example, management buffer 304 for management packets may be utilized on both the transmit and/or receive sides. In various embodiments of the invention, strict priority may be given to management traffic over any user traffic although the invention may not be so limited. Some received packets, for example, broadcast packets, may be duplicated in both a management receive buffer and a user traffic receive buffer 312.

Figure 4:
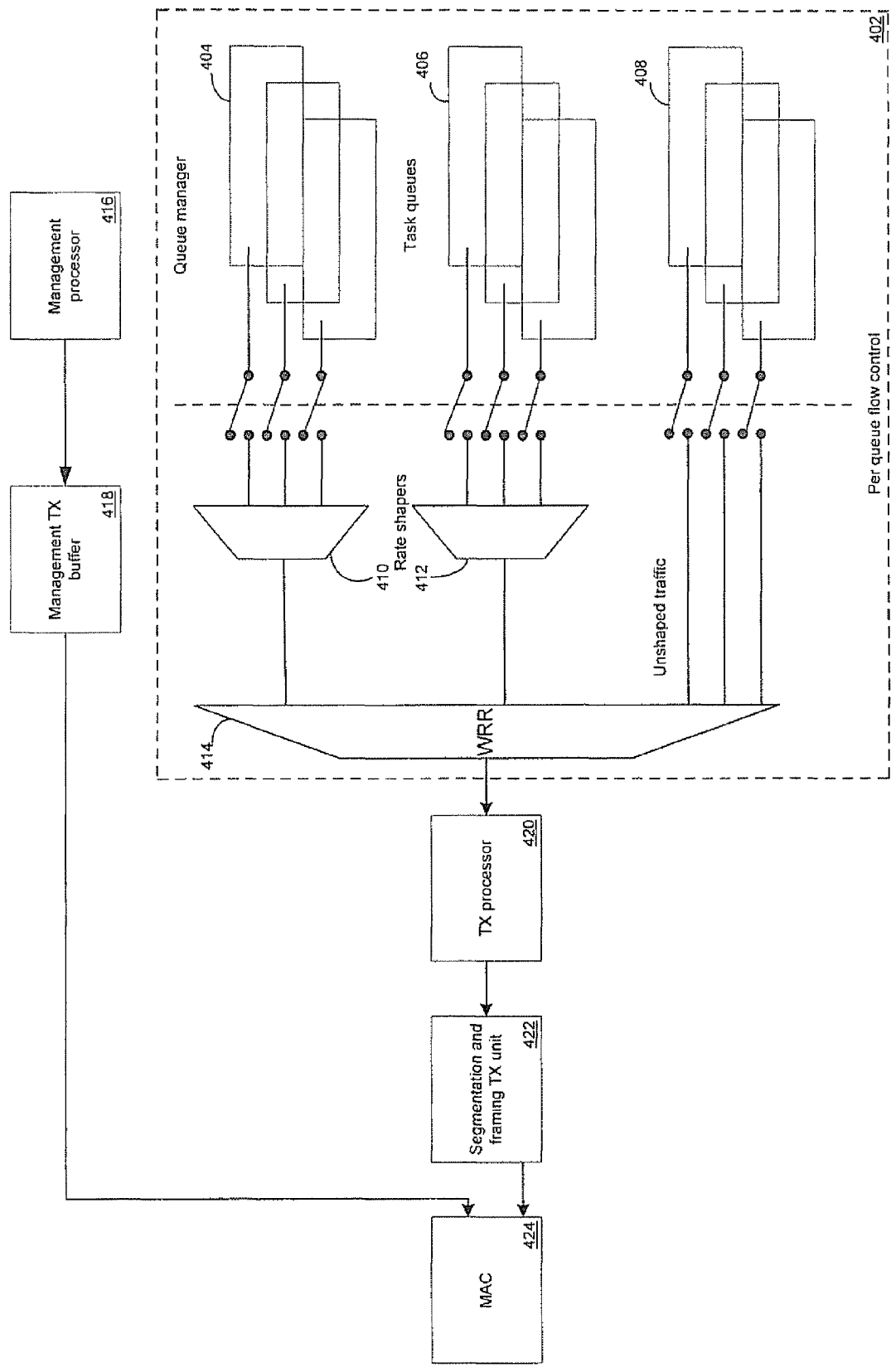
FIG. 4 is a block diagram of an exemplary system illustrating per queue flow control, in accordance with an embodiment of the invention.

FIG. 4 is a block diagram of an exemplary system illustrating per queue flow control, in accordance with an embodiment of the invention. Referring to FIG. 4, there is shown a queue manager 402, a transmit processor 420, a segmentation and framing transmit unit 422, a management processor 416, a management transmit buffer 418, and a MAC layer block 424. The queue manager 402 may comprise a plurality of task queues, 404, 406, and 408, a plurality of rate shapers 410 and 412 and a selector 414.

The queues 404, 406 and 408 may comprise connection identifiers for a plurality of input/output (I/O) requests. The rate shapers 410 and 412 may comprise suitable logic, circuitry and/or code that may be enabled to rate limit certain classes of service based on their connection identifiers. The rate shapers 410 and 412 may comprise a plurality of switches that may select a portion of a plurality of queues based on their respective connection identifiers and the level of congestion within the queues. The rate shapers 410 and 412 may enable selection of a plurality of queues and transmit them to a selector 414. The selector 414 may use a suitable algorithm, for example, a weighted round robin algorithm to select among various queues to transmit to the transmit processor 420. The transmit processor 420 may process the received queues from the queue manager 402 and store at least a portion of information for the processed queues in the segmentation and framing transmit unit 422 before transmitting them to the MAC layer block 424. The transmit processor 420 may provide the segmentation and framing transmit unit 422 with information to build packet headers. The transmit processor 420 may also provide the segmentation and framing transmit unit 422 with the location of the payload on the host memory.

Traffic shaping may be performed on ingress task queues 404 and 406. Whenever a task is dequeued from an arbitrated queue, its transmission credit may be decremented by a pre-specified amount of bytes, for example, X bytes. The transmit processor 420 may comprise suitable logic, circuitry and/or code that may enable determining whether the task needs to transmit Y bytes, and if Y is smaller than X, the transmit processor 420 may add X−Y bytes to the queue's credit in order to close the credit loop faster, therefore avoiding limiting the throughput of applications that may send short I/Os. During processing of the task, if the transmit processor 420 realizes that the task needs to send Y bytes, and Y is greater than X, the transmit processor 420 may register the task to the tail of the queue from which the task arrived. Accordingly, the transmit processor 420 may prepare only the first X bytes for transmission over the wire. Notwithstanding, after either X or Y bytes have been transmitted by the segmentation and framing transmit unit 422, the segmentation and framing transmit unit 422 may return the number of bytes transmitted to the queue's credit and to the task itself.

Other aspects of the invention may comprise applying flow control for selected classes of service, and controlling the flow from the ingress task queues, 404, 406 and 408. In order to minimize the round-trip time of the flow control, incoming flow control packets with no data or just the control information and/or flow control at lower layers, for example, L2 may be transferred immediately to the transmit processor 420, bypass the receive buffer 312, receive processing pipeline 314, and other pending transmit tasks.

In one exemplary embodiment of the invention, the task queues associated with the class or classes of service for which it received flow control information may be disabled for a given amount of time. This approach may provide immediate relief for the congestion on a guaranteed delivery class of service, for example, storage traffic without degrading the latency of a latency-sensitive class of service, for example, clustering traffic. In another exemplary embodiment of the invention, the task queues associated with the class or classes of service for which it received flow control information may be marked as congested for a given amount of time. TCP connections that are processed out of a queue that is marked as congested may apply TCP flow control as if a packet has been dropped on the connection. This may significantly reduce the round trip time of TCP flow control. The end-to-end round trip time becomes the round trip time over a single link in the network. This reduction in round-trip time translates to a reduction in buffer space requirements on the network In another exemplary embodiment of the invention, the rate limit of the task queues associated with the class or classes of service for which it received flow control information, or the rate limit of the flows indicated by the flow control information, may be dynamically modified in an additive increase multiplicative decrease (AIMD) manner.

To ease provisioning of the quality of service policy, the network interface device 202 may be shipped with a pre-configured policy, or with several pre-configured policies. RDMA connections may require low latency, while iSCSI traffic may require guaranteed delivery. These factors may be taken into account and pre-configured profiles may be built that map each of the above protocols or acceleration techniques to a different class of service by mapping, for example, the 802.1p priority field, the VLAN field, or the DSCP field in all packets belonging to that traffic type. Ingress traffic may be classified based on similar criteria to achieve quality of service with zero or very little configuration. Any indication provided by the application or the operating system may be utilized. For example, if any of the above mapping is already set or partially set before the CNIC processes it, the CNIC may take it into account when prioritizing the I/O request or network packets or when allocating bandwidth to it.

Figure 5:
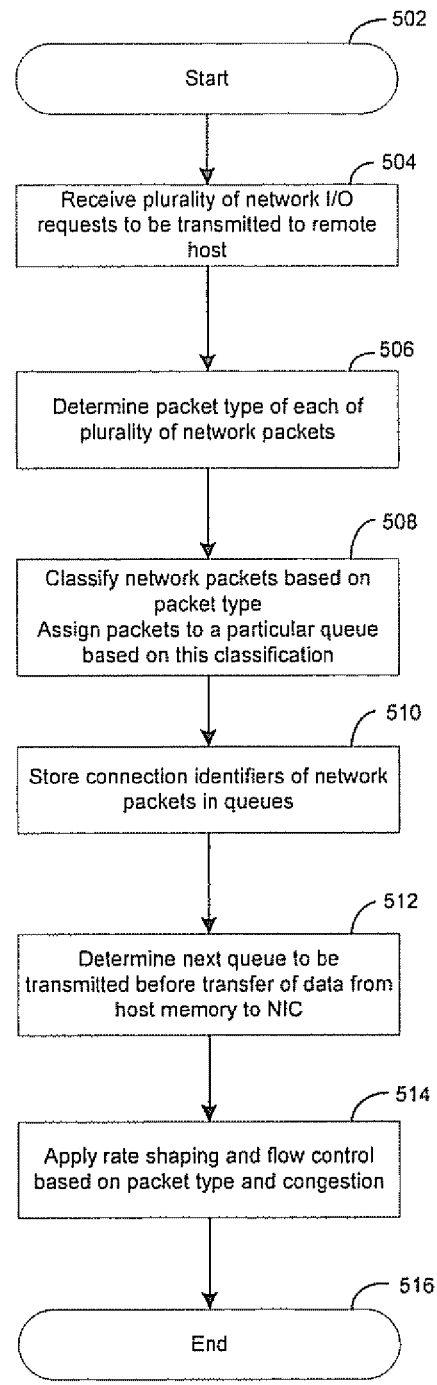
FIG. 5 is a flowchart illustrating quality of service and congestion management for converged network interface devices, in accordance with an embodiment of the invention.

FIG. 5 is a flowchart illustrating quality of service and congestion management for converged network interface devices, in accordance with an embodiment of the invention. Referring to FIG. 5, exemplary steps may begin at step 502. In step 504, a plurality of I/O requests transmitted to a remote host 140 (FIG. 1C) may be received. In step 506, a class for each of the plurality of I/O requests or network packets may be determined. In step 508, the plurality of I/O requests or network packets may be classified based on their class. Based on this classification the I/O requests or packets may be assigned to a particular queue. In step 510, a connection identifier for each of the plurality of I/O requests or network packets may be stored in the plurality of queues. In step 512, the arbitration of the next queue to be transmitted to the remote host 140 may be performed prior to transfer of data corresponding to the plurality of I/O requests or network packets from a host memory 126 to a CNIC processor 130. In step 514, the rate at which the plurality of I/O requests or network packets are handled at the CNIC processor 130 may be regulated based on the determined class of the plurality of I/O requests or network packets and the congestion of packet traffic corresponding to the particular class.

In accordance with an embodiment of the invention, a method and system for quality of service and congestion management for converged network interface devices may comprise a converged network interface card (CNIC) processor 114 that may enable processing of at least one of: input/output (I/O) requests and network packets based on a class associated with each of the I/O requests and network packets by storing on the CNIC processor 114, information that identifies the I/O requests and network packets, without storing the I/O requests and network packets on the CNIC processor 114. For example, a connection identifier for each of the plurality of network packets or I/O requests may be stored in the plurality of queues on CNIC processor 114. The CNIC processor 114 may enable determination of a class for each of the I/O requests or network packets to be transmitted based on at least one of: a header and content of each of the I/O requests and network packets. The CNIC processor 114 may enable selection of a particular queue associated with the I/O requests and network packets to be transmitted to a remote host or CPU 102 based on the class. The CNIC processor 114 may disable at least one queue associated with the I/O requests and network packets to be transmitted to a remote host or CPU 102 based on the class.

The CNIC processor 114 may enable filtering of the I/O requests or network packets based on the class. The CNIC processor 114 may enable regulation of a rate at which the I/O requests or network packets are handled at the CNIC processor 114 based on at least one pre-configured quality of service policy. The CNIC processor 114 may enable regulation of a rate at which the I/O requests or network packets are handled at the CNIC processor 114 based on the class of the I/O requests and network packets. The CNIC processor 114 may enable bypassing of receive processing for transfer of data corresponding to the I/O requests or network packets from a host memory 106 to the CNIC processor 114. The CNIC processor 114 may enable prioritization of an order of the I/O requests and network packets in the plurality of queues based on the class.

Another embodiment of the invention may provide a machine-readable storage, having stored thereon, a computer program having at least one code section executable by a machine, thereby causing the machine to perform the steps as described above for quality of service and congestion management for converged network interface devices.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling data in a communication network, the method comprising:
   receiving a network packet at a network interface card (NIC);
   storing on said NIC, a connection identifier corresponding to said received network packet, wherein said received network packet is not stored on said NIC;
   determining a class associated with said received network packet;
   processing said received network packet in said NIC based on said stored connection identifier and said determined class; and
   fetching said network packet by said NIC from a host memory via a host interface, the host memory being separate from said NIC, said NIC being configured to transmit said network packet to a remote host.

2. The method according to claim 1, comprising determining said class for said received network packet based a header and content of said received network packet.

3. The method according to claim 1, comprising selecting a particular queue associated with said received network packet to be transmitted to a remote host based on said class.

4. The method according to claim 1, comprising disabling a particular queue associated with said received network packet to be transmitted to said remote host based on said class.

5. The method according to claim 1, comprising filtering said received network packet based on said class.

6. The method according to claim 1, wherein said received network packet is one of a plurality of network packets received at said NIC, wherein said connection identifier corresponds to said plurality of received network packets, wherein the method further comprises regulating a rate at which said plurality of received network packets are handled at said NIC based on at least one pre-configured quality of service policy.

7. The method according to claim 1, wherein said received network packet is one of a plurality of network packets received at said NIC, wherein said connection identifier corresponds to said plurality of received network packets, wherein the method further comprises regulating a rate at which said plurality of received network packets are handled at said NIC based on said class of said received network packet.

8. The method according to claim 1, wherein said NIC is a converged network interface card (CNIC).

9. The method according to claim 1, wherein said received network packet is one of a plurality of received network packets received at said NIC, wherein said connection identifier corresponds to said plurality of received network packets, wherein the method further comprises prioritizing an order of plurality of received network packets in a plurality of queues based on said class.

10. The method according to claim 1, wherein said host memory comprises a transmit buffer.

11. The method according to claim 1, wherein said host interface comprises a peripheral component interconnect.

12. The method according to claim 1, wherein said NIC is implemented within a chip set, the chip set being communicatively coupled to a central processing unit, the chip set being further communicatively coupled to said host memory.

13. A non-transitory machine-readable storage medium having stored thereon, a computer program having at least one code section for handling data in a communication network, the at least one code section being executable by a machine for causing the machine to:
   receive a network packet at a network interface card (NIC) from a local host via a local bus;
   store on said NIC, a connection identifier corresponding to said network packet without storing said network packet on said NIC;
   determine a class associated said network packet; and
   process said network packet in said NIC based on said stored connection identifier and said determined class for transmission of said network packet to a remote host.

14. The non-transitory machine-readable storage medium according to claim 13, wherein said at least one code section comprises code for determining said class based on a header and content of said network packet.

15. The non-transitory machine-readable storage medium according to claim 13, wherein said at least one code section comprises code for selecting a particular queue associated with said network packet to be transmitted to said remote host based on said class.

16. The non-transitory machine-readable storage medium according to claim 13, wherein said at least one code section comprises code for filtering said network packet based on said class.

17. The non-transitory machine-readable storage medium according to claim 13, wherein said at least one code section comprises code for regulating a rate at which a plurality of network packets are handled at said NIC based on at least one pre-configured quality of service policy.

18. The non-transitory machine-readable storage medium according to claim 13, wherein said at least one code section comprises code for regulating a rate at which a plurality of network packets are handled at said NIC based on said class of said network packet.

19. The non-transitory machine-readable storage medium according to claim 13, wherein said NIC is a converged network interface card (CNIC).

20. The non-transitory machine-readable storage medium according to claim 13, wherein said at least one code section comprises code for prioritizing an order of said network packet in a queue based on said class.

21. A system for handling data in a communication network, the system comprising:
one or more circuits, one or more processors, or any combination thereof for use in a network interface card (NIC), said one or more circuits, one or more processors, or any combination thereof being operable to receive an input/output (I/O) request;
said one or more circuits, one or more processors, or any combination thereof being operable to store on said NIC, a connection identifier corresponding to said I/O request, wherein said I/O request is not stored on said NIC;
said one or more circuits, one or more processors, or any combination thereof being operable to determine a class associated with said I/O request; and
said one or more circuits, one or more processors, or any combination thereof being operable to process said I/O request in said NIC based on said stored connection identifier and said determined class, wherein said I/O request is stored in a host memory, said host memory being separate from said NIC and local to said NIC, and wherein said NIC is configured to transmit said I/O request to a remote host.

22. The system according to claim 21, wherein said one or more circuits, one or more processors, or any combination thereof are operable to determine said class of said I/O request to be transmitted based on a header and content of said I/O request.

23. The system according to claim 21, wherein said one or more circuits, one or more processors, or any combination thereof are operable to select a particular queue associated with said I/O request to be transmitted to said remote host based on said class.

24. The system according to claim 21, wherein said one or more circuits, one or more processors, or any combination thereof are operable to disable at least one queue associated with said I/O request to be transmitted to said remote host based on said class.

25. The system according to claim 21, wherein said one or more circuits, one or more processors, or any combination thereof are operable to filter said I/O request based on said class.

26. The system according to claim 21, wherein said one or more circuits, one or more processors, or any combination thereof are operable to regulate a rate at which a plurality of I/O requests are handled at said NIC based on at least one pre-configured quality of service policy.

27. The system according to claim 21, wherein said one or more circuits, one or more processors, or any combination thereof are operable to regulate a rate at which a plurality of I/O requests are handled at said NIC based on said class of said I/O request.

28. The system according to claim 21, said NIC is a converged network interface card (CNIC).

29. The system according to claim 21, wherein said I/O request is one of a plurality of I/O requests, wherein said one or more circuits, one or more processors, or any combination thereof are operable to prioritize an order of said I/O requests in a plurality of queues based on said class.

\* \* \* \* \*